Patented Oct. 20, 1931                                                              1,828,114

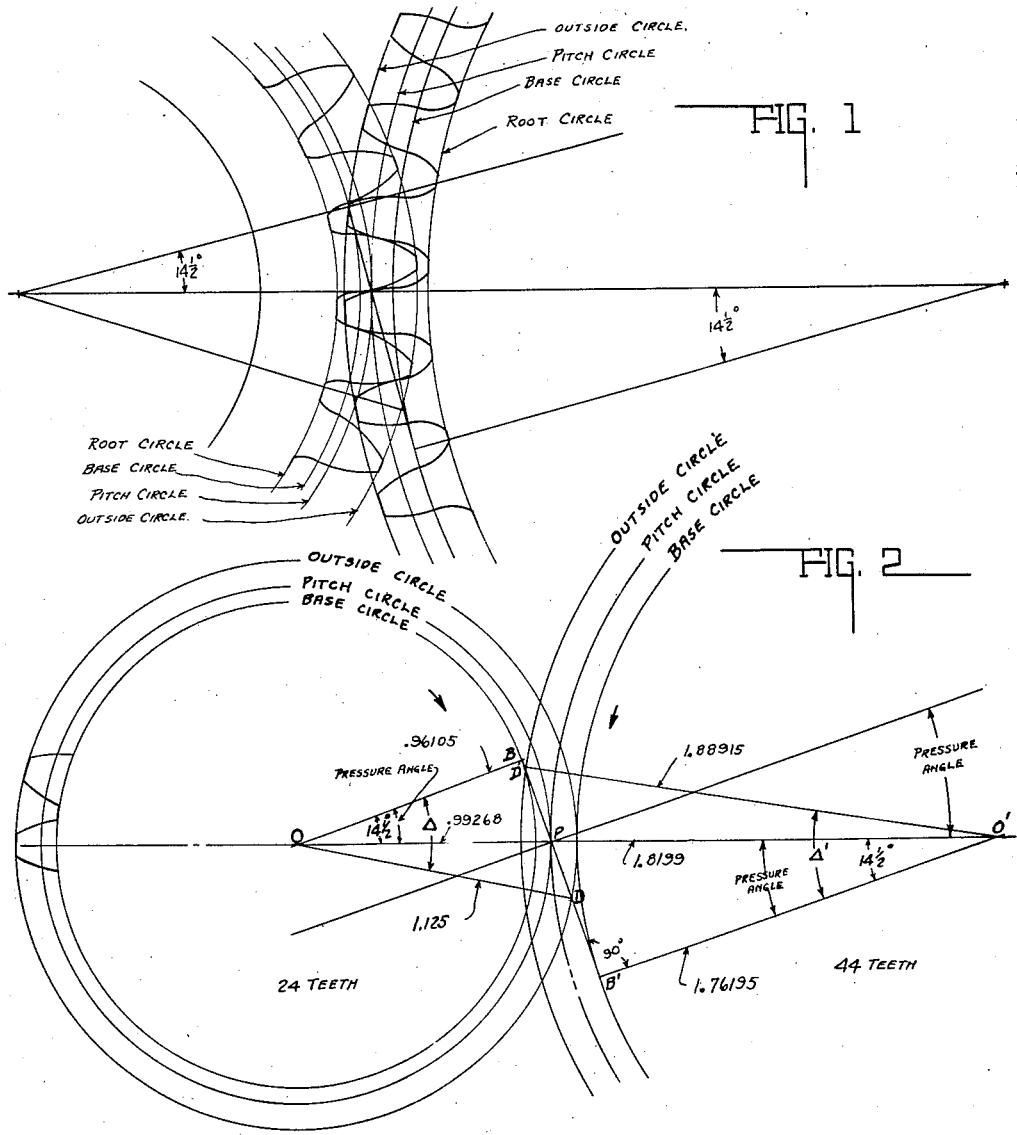

UNITED STATES PATENT OFFICE

WILLIAM H. HUBBARD, OF MUNCIE, INDIANA

MATING SPUR GEAR

Application filed May 29, 1926, Serial No. 112,522. Renewed March 7, 1931.

This invention relates to mating involute spur gears.

The chief object of this invention is to provide a pair of mating involute spur gears each with a suitable number of teeth and have the same so formed that at all times there will be at least two teeth of either mating gear meshing with at least two teeth on the other gear, or conversely at no time will one tooth bear the entire load.

The chief feature of the invention consists in the selection of special values for certain variables in mating involute spur gear functions, whereby there will always be at least two pairs of teeth in contact, thereby either increasing the factor of safety over a set of substantially similar standard gears or increasing the power transmission capacity with the same factor of safety, or the reduction in size of the gear set for the same power transmission capacity and factor of safety.

The most important variables which are affected and permit two or more teeth of one gear to constantly mesh or engage the teeth upon the mating gear are: the number of teeth, diametral pitch, pressure angle, the addendum, the center distance, and the circular thickness of the teeth.

The selection of these values is dependant upon the conditions under which the gears are to run, such as, the torque to be transmitted, the speed at which the set is run, the ratio between the gears, center distance, number of teeth, and the factor of safety required.

The full nature of the invention will be understood from the accompanying drawings and the following description and claims:

Fig. 1 is an enlarged diagrammatic view of a specific example of the invention showing the mating portions of involute spur gears. Fig. 2 is a similar view on a somewhat smaller scale of the general gear diagram for multiple mating involute spur gears.

In Fig. 1 of the drawings there is illustrated a specific example of the invention. The following table contains the data for this solution of the problem:

| 2.1826 center distance | Driver | Driven |
|---|---|---|
| Number of teeth | 24 | 44 |
| Diametral pitch | 12.0884 | 12.0884 |
| Outside diameter | 2.2500 | 3.7783 |
| Pitch diameter | 1.98536 | 3.6398 |
| Base circular diameter | 1.9221 | 3.5239 |
| Root diameter | 1.797 | 3.3253 |
| Pressure angle in degrees | 14½ | 14½ |
| Circular pitch | .25988 | .25988 |
| Base circular pitch | .25160 | .25160 |
| Addendum | .1323 | .0692 |
| Dedendum | .0942 | .1573 |
| Working pitch | .2015 | .2015 |
| Full depth | .2265 | .2265 |
| Chordal thickness | .1448 | .1140 |
| Corrected addendum | .1396 | .0701 |
| Length active profile | .2266 | .1318 |
| Teeth in contact | 2.234 | 2.234 |
| Tang. pressure | 1045 | 1045 |
| Width of land | .033 | .073 |

For a better understanding of the general solution, the following definitions or mathematical descriptions are given:

The diametral pitch equals:

$$\frac{\text{No. of teeth}}{\text{diam. of pitch-circle in in.}} = \frac{3.1416}{\text{circular pitch}}$$

Pitch diameter equals:

$$\frac{\text{No. of teeth}}{\text{diametral pitch}}$$

Pressure angle or angle of obliquity is the angle which a common tangent to the teeth, when they are in contact at the pitch point, makes with a line joining the centers of the gears.

Line of action is a line drawn through the pitch point and tangent to the base circles of the mating gears. The normal to these base circle tangential points forms, with the line connecting the centers of the gears, the pressure angle as well. Thus the pressure angle determines the size of the base circle.

The active profile of an involute spur gear has its inception at the base circle and is terminated at the outside circle.

Circular pitch equals:

$$\frac{3.1416}{\text{diametral pitch}}$$

Center distance is the perpendicular distance between the centers of the two mating gears.

The addendum is the difference between the outside circle radius and the pitch circle radius.

Circular thickness is the length of an arc of the pitch circle from one side of the tooth to the other side of the same tooth. Solving Fig. 1 we have:

Circular pitch $= \frac{3.1416}{12.0884} = .25988$

Base circular pitch =
   $.25988 \times .96815$ (cosine of $14\frac{1}{2}°$) $= .25160$ $\frac{.96105}{1.125} = \cos\triangle = .85426;\ 31°\ 19' = \triangle$ $.96105 \times .25862 = .24854 = BP$
$1.125 \times .51977 = .5847 = BD$
$PD = BD - BP = .5847 - .2485 = .3362$ $\frac{1.76195}{1.88915} = \cos\triangle' = .93266;\ 21°\ 9' = \triangle'$ $1.76195 \times .25862 = .4556 = B'P$
$1.88915 \times .36081 = .6818 = B'D'$
$PD' = B'D' - B'P = .6816 - .4556 = .2260$
$PD$ plus $PD' = DD'$ active part of line of action $.3362$ plus $.2260 = .5622$ $\frac{.5622}{.25160} = 2.234$ number of teeth in contact.

$.51977 = $ sine $31°\ 19'$     $.36081 = $ sine $21°\ 9'$
$.25862 = $ tangent $14\frac{1}{2}°$   Diametral pitch $= 12.0884$
Pressure angle $= 14\frac{1}{2}°$ The following shows limits of variables used in solution of problem.

Diametral pitch = DP limits 1/8 to 100
Pressure angle B has limits
   (0° plus) to (90° minus)

Circular pitch = CP = $\frac{3.1416}{DP}$

Number of teeth =
   N has limits two to infinity minus one.

Pitch diameter = PD = $\frac{N}{DP}$

Addendum = A has limits $\left[\frac{(1}{DP}\text{ plus or minus a limits}\left(0\text{ to }\frac{1}{DP}\right)\text{ to }\frac{3.1416}{DP}\right]$ Outside diameter = OD = $\frac{N}{DP}$ plus 2A Base circle diameter = BD =
   PD $\times$ cos pressure angle (B)

Formula for solution of problem: All references to the above carries with it the limits as stated.

|  | Driver | Driven |
|---|---|---|
| Pressure angle | B | B |
| Circular pitch | $\frac{3.1416}{DP}$ | $\frac{3.1416}{DP'}$ |
| Base circular pitch is the circular pitch × the cos of the pressure angle | | |
| Outside circle radius | OD | O'D' |
| Pitch circle radius | OP | O'P |
| Base circle radius | OB | O'B' |
| Active part of line of action | DD' | DD' |
| Line of action | BB' | BB' |

Formula for solution of problem:

Driver          Driven $\frac{OB}{OD} = \cos\triangle$      $\frac{O'B'}{O'D'} = \cos\triangle'$ $OD \times \sin\triangle = BD$    $O'D' \times \sin\triangle' = B'D'$
$OB \times \tan B = BP$    $O'B' \times \tan B = B'P$
$PD = BD - BP$    $PD' = B'D' - B'P$ $PD$ plus $PD'$ = active line of action $\frac{PD \text{ plus } PD'}{\text{base circular pitch}} = $ number of teeth in contact two or more For example B'P is the limit of D'P and BP is the limit of DP or when a case arises where D'P is greater than B'P or where DP is greater than BP the value of B'P and BP must be used respectively.

The sum of the circular thickness of one tooth each of both gears must equal the circular pitch less the backlash but not necessarily be equal to each other.

*Statement of absurdities*

The limits used in the diametral pitch, pressure angle, number of teeth, addendum and circular thickness in some cases when combined would be absurd. The reason for such limits is to include all practical arrangements and applications, and endeavor to express multiple tooth contact as a mathematical function.

The invention claimed is:

1. A pair of mating involute spur gears, the pinion gear having less than thirty teeth, each of said gears at all times having at least two teeth in contact with the teeth of the other gear and operating on fixed centers, said gears having a line of action greater than two and inequally divided by the pitch point with the greater length of active profile included in the pinion.

2. A pair of mating involute spur gears having multiple tooth contact between each gear at all times, the pinion gear having less than thirty teeth and the gears having the following formula:

Driver $$\frac{OB}{OD} = \cos \triangle$$

$$OD \times \text{sine} \triangle = BD$$
$$OB \times \text{tangent} B = BP$$
$$PD = BD - BP$$

Driven $$\frac{O'B'}{O'D'} = \cos \triangle'$$

$$O'D' \times \text{sine} \triangle' = B'D'$$
$$O'B' \times \text{tangent} B = B'P'$$
$$PD' = B'D' - B'P$$

PD plus PD' active line of action $$\frac{PD \text{ plus } PD'}{\text{base circular pitch}} = \text{number of teeth in continuous contact} = \text{at least two teeth, but is never integral.}$$

3. A pair of mating involute spur gears as defined by claim 2, wherein the gears operate on a fixed center distance and the smaller gear has an addendum, length of active profile, and circular thickness greater than the larger gear for insuring multiple tooth contact.

In witness whereof I have hereunto affixed my signature.

WILLIAM H. HUBBARD.